Oct. 7, 1969   W. B. HAVER   3,471,013
CONVEYOR-FED AERODYNAMIC SEPARATOR
Filed Feb. 23, 1968
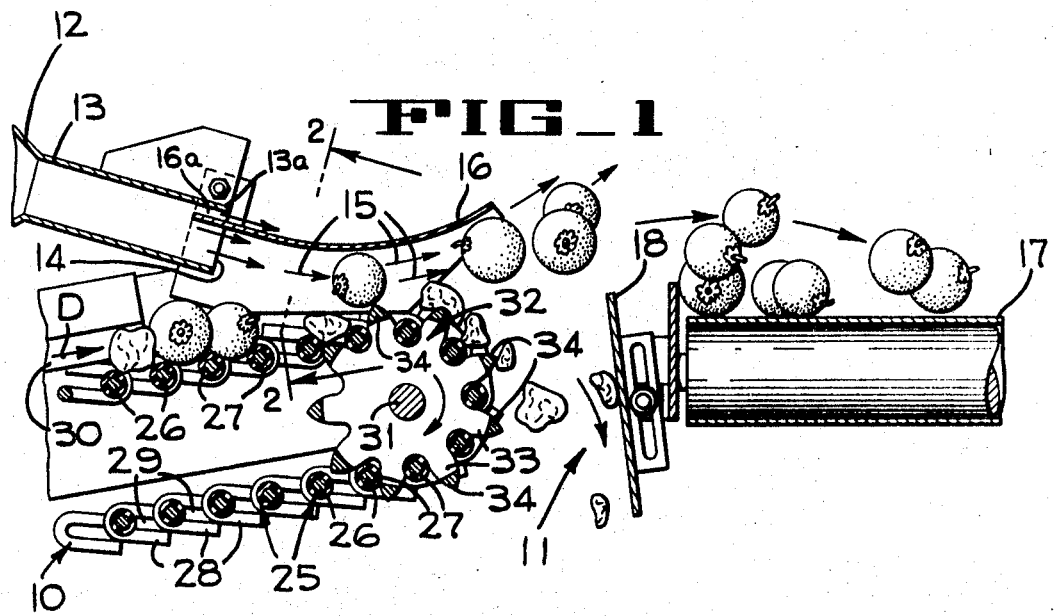
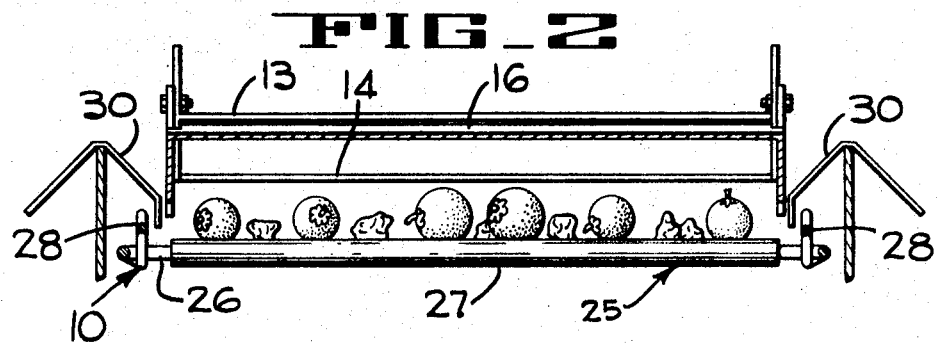
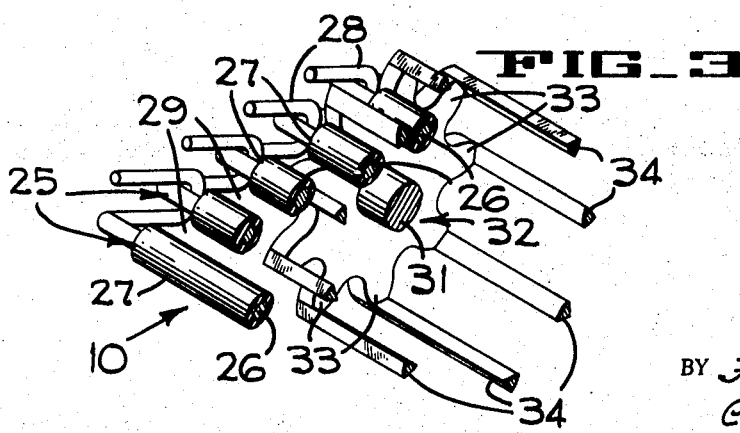
INVENTOR.
WILLIAM B. HAVER
BY J.W. Anderson
C.E. Tripp
ATTORNEYS

United States Patent Office 3,471,013
Patented Oct. 7, 1969

3,471,013
CONVEYOR-FED AERODYNAMIC SEPARATOR
William B. Haver, San Jose, Calif., assignor to FMC Corporation, San Jose, Calif., a corporation of Delaware
Filed Feb. 23, 1968, Ser. No. 707,539
Int. Cl. B07b 7/00
U.S. Cl. 209—133                                5 Claims

ABSTRACT OF THE DISCLOSURE

Apparatus for subjecting tomatoes, rocks and debris on a feeder conveyor to a stream of air for separation by the stream of air. The feeder conveyor is formed with spaced, transverse rods linked together at their ends. The delivery end of the conveyor passes over spaced sprockets having transverse bars extending laterally between their teeth so that the sprocket bars project upwardly between the rods of the conveyor and hence bump or lift the articles into a stream of air flowing over the conveyor.

Cross-reference to related applications

This application is related to the application of John Boyce, Ser. No. 688,484, filed December 6, 1967, for Aerodynamic Sorting, assigned to the FMC Corporation, but includes an improvement in the loose material conveyor disclosed in that application.

Field of the invention

The present invention relates to mechanism for sorting articles with a stream of air and, more particularly, to improvements in conveyor apparatus for propelling the articles into the stream of air for sorting.

The invention is particularly applicable to harvesters, such as tomato and potato harvesters, which gather debris with the fruit, and wherein a stream of air is used to separate the fruit from the rock and dirt.

Summary of the invention

In one type of harvester, shown in the copending patent application of Raymond Sackett and Leon R. McRobert, entitled Harvesting Apparatus, Ser. No. 571,842, filed Aug. 11, 1966, now abandoned, and assigned to the FMC Corporation, a stream of air is utilized to separate articles according to their density by blowing the lighter articles, such as potatoes, away from the heavier objects such as rocks and debris.

In another type of harvester, shown in the aforesaid copending patent application of John Boyce, the stream of air is utilized to separate the articles principally on the basis of their shape and surface texture, by aerodynamically lifting the smooth, rounded objects, such as tomatoes, up from the rough, irregular objects, such as rocks or clods of dirt.

In both types of mechanism, it is important to get the objects (particularly the fruit) which are fed into the air stream by a conveyor, up off the feeding conveyor and into the stream of air, if the air is to have maximum effectiveness in separating the fruit from the rocks and debris on the conveyor. In the present invention, effectiveness of the air stream is enhanced by lifting, or bumping the objects, including the fruit, off the surface of the feeder conveyor and up into the air stream, so that the air stream impinges upon them fully, and hence can operate with maximum effectiveness to separate the fruit from the debris.

In brief, the feeder conveyor is continuous with an upper run on which the mixture of fruit and debris is carried into the air stream. The conveyor is made of parallel, spaced, transverse rods, linked together at their ends. The delivery end of the conveyor passes over a pair of laterally spaced sprockets having teeth that project between the transverse conveyor rods. In order to provide the desired lifting action, transverse bumper bars are connected between the teeth of the delivery sprockets, which bars enter between and project radially beyond the outer surface of the conveyor rods. As the sprockets rotate, the sprocket bars strike objects on the conveyor rods and bump, lift or propel those objects into a stream of air which is directed to pass over the delivery end of the conveyor.

In the disclosed embodiment of the invention, the separation system is used for aerodynamically sorting tomatoes from clods. Once the tomatoes are bumped into the air stream, an aerodynamic lifting action is exerted on the tomatoes which causes them to have a longer trajectory than that of the clods, etc., thereby facilitating sorting of the tomatoes from the clods.

Brief description of the drawings

FIGURE 1 is a partial cross-section of a sorting sytem, showing the mechanism of the present invention applied to a tomato sorting system;

FIGURE 2 is a view taken on the line 2—2 of FIGURE 1; and

FIGURE 3 is an enlarged perspective view of the delivery end of the feeder conveyor.

Description of preferred embodiment

There is shown in the drawings conveyor mechanism to separate tomatoes, or other smooth rounded fruit, from rough irregularly shaped objects, such as dirt and rocks, similar to that shown on a tomato harvester in the aforesaid copending patent application of John Boyce, Ser. No. 688,484. The machine has a delivery or feeder conveyor 10 which receives a mixture of tomatoes, rocks, clods and debris, such as gathered in the field by a tomato harvester. The feeder conveyor 10 slopes upwardly and moves the mixture in the longitudinal direction indicated by the arrow D toward a discharge zone 11. A blower 12 (exit end only shown) has a discharge duct or nozzle 13 terminating in an opening 14 from which flows a stream of air as indicated by the arrows 15. The blower is of conventional design and may be like that of the aforesaid Boyce application. However, the details of the blower itself are not critical to the present invention.

An air foil 16 is connected to the delivery end of the blower nozzle or duct 13 and the air foil guides the stream of air across the discharge zone of the delivery conveyor 10. A gap 16a is formed between the air foil 16 and the upper wall 13a of the duct 13 so that air flows on both sides of the air foil. This bleeds off some of the air at the transition zone between the air foil and the duct, and minimizes turbulence at that zone. Thus a smooth, streamline flow of air 15 leaves the duct 13 and continues on around the underside of the air foil 16.

A discharge conveyor 17, which extends transversely to the delivery conveyor 10, is located at the discharge area 11 and is spaced from the discharge end of the delivery conveyor 10. A deflector plate 18 is mounted at the rear side of the discharge conveyor 17 is order to deflect clods of dirt, etc., falling from the discharge conveyor 10, from entering into parts of the discharge conveyor.

The delivery conveyor 10 comprises a plurality of transverse flights indicated generally at 25, in the form of rods 26 having rubber sheaths 27. The rods extend in parallel spaced relationship and are bent into hooks 28 (FIG. 3) which link to adjacent rods to form a grid-like conveyor surface. The spacing of the flights 25 provides elongated transverse openings or interstices 29 between the flights, and in the embodiment illustrated, these opening extend across the entire width of the delivery conveyor 10, for receiving the bumper bars to be described.

Shields 30 (FIG. 2) on each side of the upper reach of the conveyor 10, extend over the interconnected conveyor links 28 to confine objects on the conveyor.

As mentioned, the delivery sprockets are specially formed under the present invention. A shaft 31 mounts a pair of spaced delivery sprockets 32 formed with teeth 33, which teeth extend into the openings 29 between the conveyor flights 25. A conventional sprocket assembly (not shown) is provided at the other end of the conveyor 10, as is described in more detail in the aforesaid Boyce application, which is incorporated herein by reference.

In order to bump the fruit into the air stream in accordance with the present invention, the ends of transverse bumper bars 34 are welded to the teeth 33 on the conveyor discharge sprockets 32. The bumper bars 34 are triangular in cross-section (FIG. 1), and extend radially through the transverse openings 29 between the conveyor flights 25 as the flights pass around the sprockets 32. When fully meshed, the transverse bumper bars 34 project radially through and terminate above or outside of the conveying surfaces provided by the conveying flights 25 (FIG. 1).

Thus, objects moving along the upper run of the conveyor and nestled between the conveyor flights, are struck by the projecting bars 34 and bumped, lifted or propelled off the conveyor surface and up into the stream of air 15. As described more fully in the aforementioned Boyce patent application, the stream of air which flows over the top of the smooth rounded tomatoes provides an aerodynamic lift effect on the tomatoes which is not exerted on the rough, irregular clods of dirt, rocks, etc., mixed in with the tomatoes. Thus, the tomatoes, which are propelled to the right as viewed in FIG. 1 by momentum and by the force of the air stream 15, attain a trajectory which passes over the guard plate 18 and onto the discharge conveyor 17.

The rocks, clods of dirt, etc., fall more steeply. Some may strike the plate 18 and drop between the plate and the end of the conveyor, others simply fall down between the two conveyors.

Not only do the transverse bumper bars 34 of the present invention serve to lift the objects on the delivery conveyor 10 up off the surface of the conveyor where the stream of air can better act on the objects, but the bars 34 also dislodge dirt, debris, and other objects which may have wedged between the rods 26 of the web 25. This cleaning action is specifically advantageous in harvesters, which must often travel wet and muddy fields.

Although the conveyor 10 is formed with a single pair of special sprockets 32 and connecting bars 34, intermediate sprockets could be provided with the bars extending between adjacent sprockets.

Having completed a detailed description of the invention so that those skilled in the art could practice the same, I claim:

1. Apparatus for separating round, smooth articles from rough, irregular articles by the application of a stream of air, said apparatus comprising a delivery conveyor providing a moving surface to carry the articles, blower means for causing a sorting stream of air generally parallel to said supporting surface and over articles supported on said conveyor surface, said conveyor having spaced article supporting means forming interstices in said conveyor surface, a movable member over which said conveyor is trained, said member having projections extending into and out of the interstices in said conveyor surface for bumping the articles off the conveyor surface and into the stream of air, said blower means including flow directing means for causing the air stream velocity across the upper portions of the bumped articles to exceed that across their lower portions with a resultant aerodynamic lifting effect on the round, smooth articles.

2. The apparatus of claim 1, wherein said blower means directs the stream of air in the direction of conveyor motion and over the discharge end of the conveyor.

3. Apparatus for separating crops such as tomatoes from clods, eetc. by the application of a stream of air, said apparatus comprising an endless article delivery conveyor having transverse rod-like flights, blower means for causing a sorting stream of air generally parallel to said conveyor and to flow over articles supported on said conveyor flights, spaced sprockets over which the discharge end of said conveyor is trained, said sprockets having teeth projecting between said conveyor flights, and bars connected to extend laterally between said sprocket teeth for projecting between the conveyor flights and bumping the articles off the conveyor surface and into the stream of air, as well as for clearing material wedged between said conveyor flights, said blower means including flow directing means for causing the air stream velocity across the upper portions of the bumped articles to exceed that across their lower portions with a resultant aerodynamic lifting effect on the tomatoes, but not on the clods, etc.

4. The apparatus of claim 3, wherein said blower means directs the stream of air in the direction of conveyor motion and over the discharge end of the conveyor.

5. The apparatus of claim 4, wherein said blower means includes a nozzle and said flow directing means comprises a downwardly convex air foil extending in the direction of conveyor motion from said nozzle.

References Cited

UNITED STATES PATENTS

| 1,005,380 | 10/1911 | Wear | 209—34 |
| 1,715,197 | 5/1929 | Grabill. | |
| 2,114,727 | 4/1938 | Thys | 209—137 X |
| 2,281,120 | 4/1942 | Stargardt | 198—195 X |
| 2,653,712 | 9/1953 | Leighton. | |
| 2,988,213 | 6/1961 | Davis. | |
| 3,227,276 | 1/1966 | Leighton | 209—154 X |

FRANK W. LUTTER, Primary Examiner

U.S. Cl. X.R.

198—195; 209—147, 154